United States Patent [19]

Battles

[11] Patent Number: 4,586,895
[45] Date of Patent: May 6, 1986

[54] METHOD OF REMOVING SLAG FROM OXYGEN FUEL BURNER

[75] Inventor: Brett E. Battles, Atlanta, Ga.

[73] Assignee: The Cadre Corporation, Atlanta, Ga.

[21] Appl. No.: 733,646

[22] Filed: May 13, 1985

[51] Int. Cl.$^4$ .............................................. F24D 23/02
[52] U.S. Cl. ........................................ 432/2; 110/263; 110/347; 266/136; 431/3
[58] Field of Search .................... 266/135, 136; 431/3, 431/121; 432/2; 110/263, 264, 265, 347

[56] References Cited

U.S. PATENT DOCUMENTS

| | | | |
|---|---|---|---|
| 1,445,679 | 2/1923 | Gray | 432/2 |
| 4,156,590 | 5/1979 | Pariani | 431/3 |
| 4,473,379 | 9/1984 | Liu | 110/347 X |

*Primary Examiner*—Edward G. Favors
*Attorney, Agent, or Firm*—Thomas & Kennedy

[57] ABSTRACT

During the operation of an oxygen-fuel burner the supply of fuel is reduced to generate an oxygen-rich low velocity flame. The excess oxygen of the flame is heated by the flame and oxidizes any slag accumulated on or about the burner.

8 Claims, 6 Drawing Figures

METHOD OF REMOVING SLAG FROM OXYGEN FUEL BURNER

BACKGROUND OF THE INVENTION

1. Field of the Invention

This invention relates to a process for removing slag from and about the surfaces of a combustion chamber of a burner of the type used in industrial, electric arc furnaces, wherein the combustion chamber of the burner is exposed to the work product and the metallic and non-metallic particles in the furnace environment results in an accumulation of slag on the burner surfaces. More specifically, the invention relates to a method of adjusting the supply of fuel and oxygen to the flame from an open combustion chamber burner of an electric arc furnace or the like so as to first heat the slag accumulated on the burner to a very hot condition and then supply an excess of oxygen through the combustion chamber of the burner to cause the slag to oxidize and therefore dissipate.

2. Description of the Prior Art

When solid metals are being heated in an electric arc furnace or similar chamber so as to melt the solid products into a molten state, it is normal that small particles of molten metal are continuously dispersed throughout the furnace environment. This is caused by the action of the arcs from the electrodes to the metal to be melted and from the interaction of the oxygen and the molten metal during the refining of the metal. This splashing of the molten metal within the furnace chamber usually results in some of the metal making contact with the the burner and the furnace wall, both of which are cooler than the molten metal, resulting in some of the particles solidifying on the surfaces of the burner and wall. If the burner has its combustion chamber extendinq toward the work product, it is likely that some of the molten metal from the work product will splash into and accumulate on and around the combustion chamber of the burner.

Most burners are operated at a surface temperature which is lower than the temperature required to melt steel or other work products. Some burners are internally cooled by the circulation of water in contact with the burner about the combustion chamber, so that the surface of the combustion chamber is maintained at a reduced temperature. Also, fuel film cooling of the surfaces of the burner combustion chamber results in the lowering of the temperature of the burner. For example, U.S. Pat. No. 4,473,350 discloses a burner having a combustion chamber that is open to the furnace atmosphere, but the burner is cooled by the circulation of a cooling liquid about the combustion chamber, and by a film of fuel formed adjacent the surfaces of the combustion chamber. As a result, when molten metal splashes into the combustion chamber, there is some likelihood that the molten metal will accumulate on the combustion chamber as slag. This is particularly so when a burner is idling, with only a minimum amount of oxygen and fuel being supplied to the burner to create a very small pilot flame in the combustion chamber of the burner.

Most hiqh velocity burners are mounted in the sidewalls of a furnace, and the build-up of slag on the burner can eventually clog the gas entry holes and other passageways of a burner. Also, the accumulation of slag on the surfaces of the burner makes it more difficult to cool the surfaces of the burner, and the temperature level of the burner tends to rise during normal operation. This tends to cause the burner to deteriorate more rapidly, and the burner must be replaced more frequently.

Preventive maintenance can be conducted with respect to burners on a regular basis, by removing a burner from its furnace and then chipping the slag away from the surface of the burner and its nose tip. For example, preventive maintenance can be performed by removing one of the three burners typically used in an electric arc furnace at the end of every eight hour shift. The withdrawn burner is cleaned while a substitute burner is used with the furnace. The burner that has been removed is cleaned bv chipping out the slag, and if necessary, replacing worn components. Typically, this kind of preventive maintenance would require about three hours of maintenance for each twenty four hours of furnace operation.

SUMMARY OF THE INVENTION

Briefly described, the present invention comprises a method of removing metallic and non-metallic materials which have accumulated on and about the combustion chamber of a burner of the type used in an electric arc furnace during normal furnace operation. The burner is the type in which the flame is generated in the combustion chamber by the passage therethrough of a stream of oxygen through the central portion of the combustion chamber and with the passage of fuel, such as natural gas, peripherally about the oxygen. In normal operation of such a burner, the amounts of fuel and oxygen are adjusted so as to generate a high velocity flame that is projected from the combustion chamber of the burner inwardly toward the work product within the furnace, with the surfaces of the burner being maintained in a relatively cool state by film cooling of the combustion chamber surfaces with the fuel, and/or with the circulation of a coolant liquid, such as water, about the burner.

The process, in general, comprises heating the surfaces of the combustion chamber with a mixture of fuel and oxygen which generates a stoichiometric flame so as to heat the slag build-up in and about the combustion chamber of the burner, and after the slag has reached the desired temperature, the ratio of oxygen and fuel is adjusted so that an oxygen-rich mixture is provided. The unburned oxygen of the flame contacts the previously heated slag build-up within and about the combustion chamber and tends to oxidize and therefore dissipate the slag.

Thus, it is an object of this invention to provide a method of removing slag from and about the surfaces of a combustion chamber of a burner of an electric arc furnace and the like by adjusting the mixture of fuel and oxygen supplied to the combustion chamber of the burner so as to dissipate the slag previously built up on and about the surfaces of the combustion chamber of the burner.

Another object of this invention is to provide a process of expediently removing the build-up of slag from the surfaces of a combustion chamber of a burner without having to remove the burner from its furnace, with the process being performed as a routine step in the normal burner operation.

Another object of this invention is to provide a convenient method of extending the operational life of a burner of an industrial furnace and the like, which does not require the burner to be removed from the furnace and does not require any special equipment or labor.

DETAILED DESCRIPTION

Figure 1:
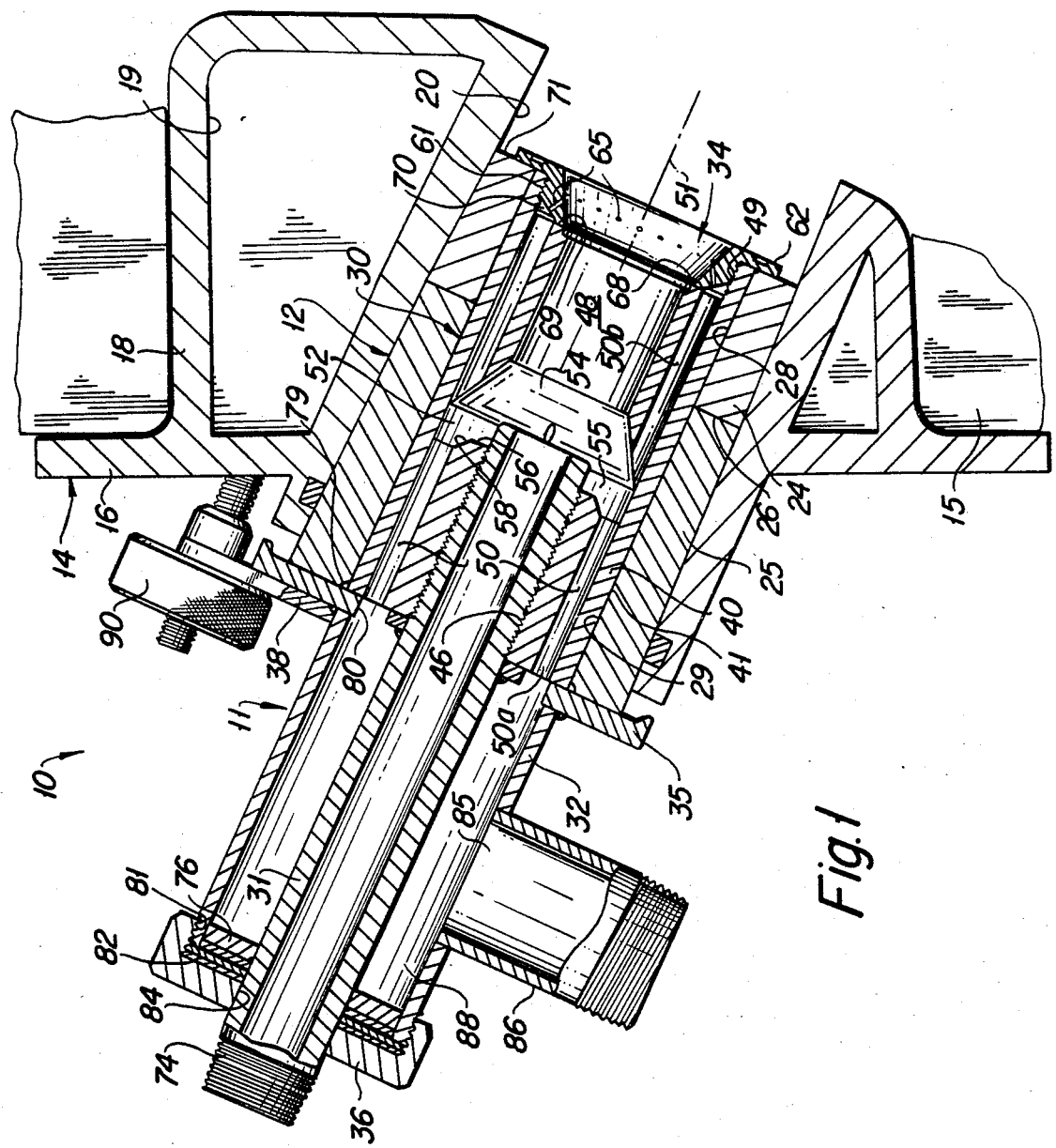
FIG. 1 is a cross-sectional illustration of a fuel cooled oxygen fuel burner, taken along the longitudinal axis of the burner.

Referring now in more detail to the drawings, in which like numerals indicate like parts throughout the several views, FIG. 1 illustrates a fuel cooled oxygen fuel burner 10 which includes a combustor assembly 11 mounted in a graphite insulator block 12, with the insulator block being mounted in a conventional water jacket burner mount 14 that is mounted in an opening of the wall 15 of an industrial furnace. The water jacket burner mount 14 includes a mounting plate 16 that is attached to the furnace wall, and an approximately annular shaped protrusion 18 that extends into the opening in the wall of the furnace. The protrusion 18 includes an internal water circulation chamber 19 through which cooling water circulates. The protrusion also defines burner opening 20 which is circular in cross-section but which is also tapered slightly from the outside toward the inside, with the smaller diameter of the burner opening facing the inside of the furnace.

The graphite insulator block 12 is formed in two approximately cylindrical segments 24 and 25, with their exterior surfaces being sized and shaped to correspond to the size and shape of the internal surfaces of burner opening 20. The facing surfaces 26 of the segments 24 and 25 of the graphite insulator block normally abut each other. The internal annular surfaces 28 and 29 of the segments 24 and 25 are cylindrical and are of the same diameter, and are coaxial.

As illustrated in FIG. 1, the combustor assembly 11 includes combustor 30, oxygen conduit 31, fuel barrel 32, nozzle ring 34, mounting plate 35, cap 36, and locking plate 38.

Figure 2:
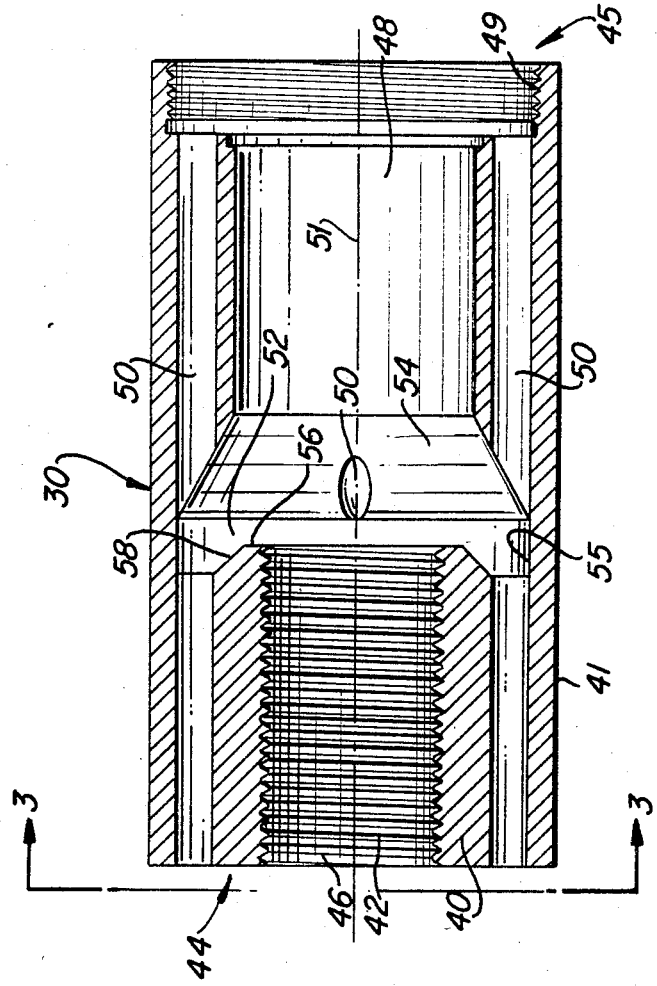
FIG. 2 is a cross-sectional view of the combustor, taken along the longitudinal axis thereof.
Figure 3:
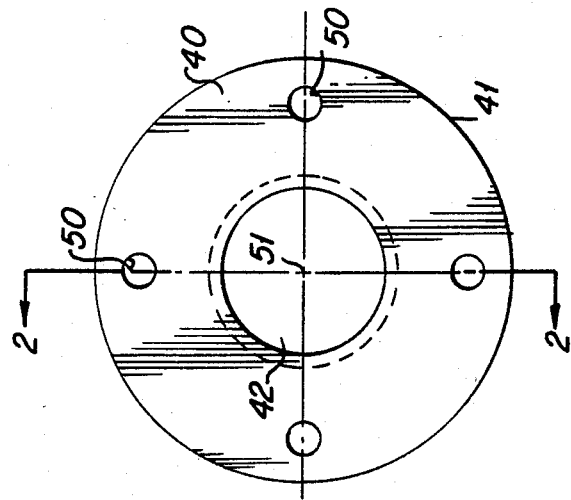
FIG. 3 is an end view of the combustor, taken along lines 3—3 of FIG. 2.

As illustrated in FIGS. 1, 2 and 3, combustor 30 is tubular shaped and is of one piece construction, with an annular wall 40 that defines a cylindrical exterior surface 41 and an axial passageway 42. The combustor 30 has a supply end 44 and a flame delivery end 45. The axial passageway 42 extends entirely through the combustor from the supply end 44 to the flame delivery end 45, and the portion of the passageway adjacent supply end 44 is formed with a spiral thread 46 to receive the threads at the delivery end of the oxygen conduit 31, so as to function as an oxygen supply passage. The portion 48 of the axial passageway 42 adjacent the flame delivery end 45 of the combustor functions as a combustion chamber. The combustion chamber 48 has a cylindrical surface that is coaxial with the oxygen supply passage 46. The flame delivery end 45 of the combustor 30 is counter bored and internally threaded at 49 so as to form a seat for the nozzle ring 34.

A plurality of fuel supply passages 50 are formed longitudinally through the annular wall 40 of the combustor 30, from the supply end 44 to the flame delivery end 45. As illustrated in FIG. 3, the fuel supply passages are arranged in a circumferential array about the combustion chamber 48, with the fuel supply passages 50 being oriented at 90° intervals about the longitudinal axis 51 of the axial passageway 42.

As illustrated in FIGS. 1 and 2, an internal groove 52 extends radially outwardly from the axial passageway 42, between the oxygen supply passage 46 and the combustion chamber 48. The internal groove 52 intersects the fuel supply passages 50, with the groove 52 being tapered at approximately a 30° angle to form a sloped annular surface 54 that tapers inwardly from the fuel supply passages 50 to the combustion chamber 48. Also, the internal groove 52 has a cylindrical channel 55 with a diameter large enough to circumscribe all of the fuel supply passages 50. The facing surface 56 of the combustor 30 at the internal end of the oxygen supply passage 46 is beveled at 58. The bevel 58 is formed at 45°, is an annular surface, and together with the sloped annular surface 54 of the internal groove 52 causes the internal groove 52 to function as a fuel diverter, as will be explained in more detail hereinafter.

Figure 6:
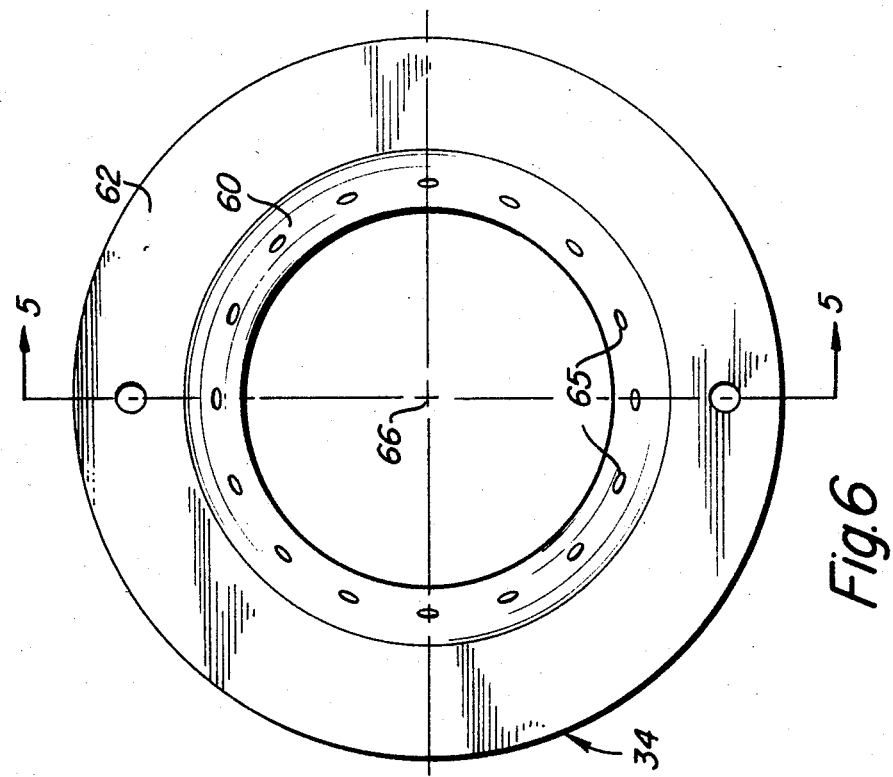
FIG. 6 is a front view of the nozzle ring.
Figure 5:
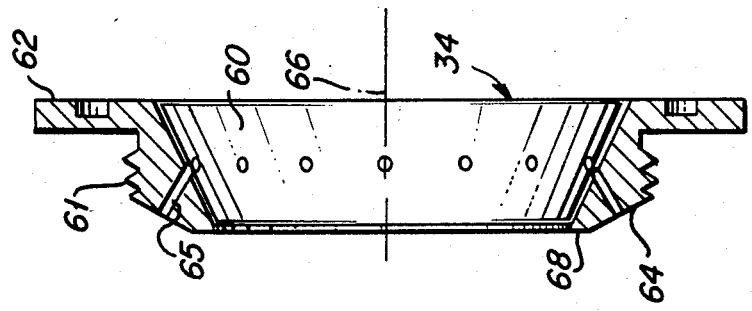
FIG. 5 is a cross-sectional view of the nozzle ring.

As illustrated in FIGS. 5 and 6, nozzle ring 34 has a tapered annular inner surface 60, a threaded annular outer surface 61, a radially protruding flange 62 adjacent the larger diameter end of the inner surface 60, and an annular beveled end 64 adjacent the smaller diameter end of the inner surface 60. A plurality of nozzle openings 65 extend through the nozzle ring 34, from the annular beveled end 64 to the tapered annular inner surface 60. The nozzle openings are arranged in an equally spaced annular array about the longitudinal axis 66, with each nozzle opening 65 directed inwardly toward the longitudinal axis 66 of the nozzle ring.

As illustrated in FIG. 1, the external threads 61 of nozzle ring 34 are sized and shaped so as to engage with the threads of the nozzle ring seat 49 of combustor 30. When the nozzle ring 34 has been screwed into position in the combustor 30, the inner end 68 of the nozzle ring becomes frictionally engaged with the recessed surface 69 of the counter bored nozzle ring seat 49, and the annular beveled end 64 of the nozzle ring forms an annular fuel supply chamber 70 with the nozzle ring seat 49. Also, the radially extending flange 62 of the nozzle ring 34 extends beyond the combustor 30 so as to overlap the exposed end surface 71 of segment 24 of graphite insulator block 12.

With this construction, the annular fuel supply chamber 70 communicates with all of the fuel supply passages 50, and the fuel received from the passages 50 can circulate in an annular path within the fuel supply chamber 70 to reach all of the nozzle openings 65. When the fuel moves through the nozzle openings 65, the fuel will be directed inwardly toward the longitudinal axis 51 of the combustor 30. In the meantime, the flange 62 shields the exposed end surface 71 of the segment 24 of the graphite insulator block 12 from heat radiation and heat convection from the flame and work product within the furnace.

Figure 4:
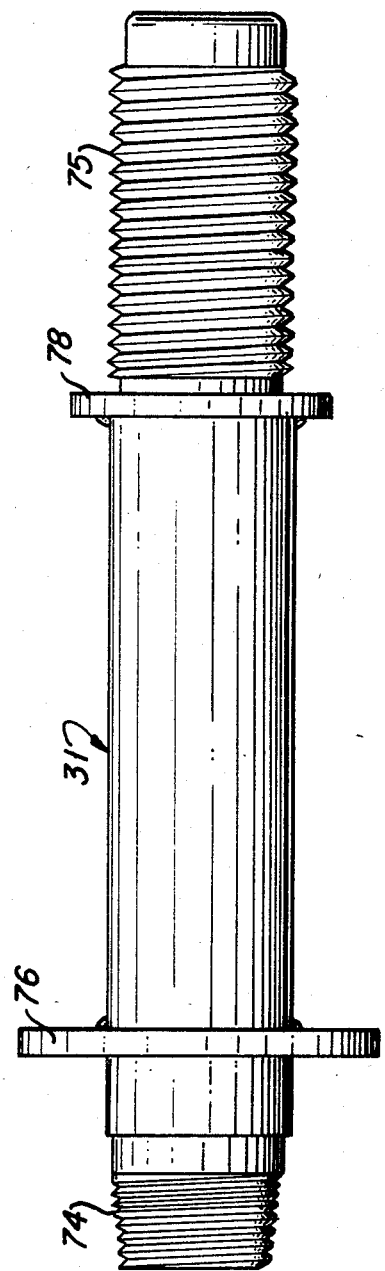
FIG. 4 is a side view of the oxygen supply barrel.

As illustrated in FIGS. 1 and 4, oxygen conduit 31 is externally threaded at both ends 74 and 75, with positioning flange 76 mounted to the exterior surface of conduit 31 adjacent thread 74, and with smaller diameter positioning flange 78 mounted to the exterior surface adjacent thread 75. Mounting plate 35 (FIG. 1) is rigidly attached to combustor 30 by means of a weldment 79 or the like, and mounting plate 35 defines a circular opening 80 which is of a diameter large enough so as to leave the fuel supply passages 50 open at the supply end 44 of the combustor. Fuel barrel 32 is cylindrical and is rigidly mounted at one of its ends to mounting plate 35, and is coaxial with the combustor 30. The other end of the fuel barrel 32 is externally threaded at 81, and the internally facing threads 82 of cap 36 engage threads 81. Cap 36 also defines a central opening 84 that fits about oxygen conduit 31. Fuel barrel 32 defines a side opening 85, and supply pipe 86 is connected to the fuel barrel about opening 85 and functions to supply fuel to the fuel barrel.

With this arrangement, fuel, such as natural gas, flows through supply pipe 86 to fuel barrel 32, and the fuel flows from the annular chamber 88 inside the fuel barrel about oxygen conduit 31 through the fuel supply passages 50. The internal groove or fuel diverter 52 divides each of the fuel supply passages into primary fuel passages 50a and fuel extension passages 50b. All of the fuel moves from fuel barrel 32 through the primary fuel passages 50a, and when the fuel reaches the fuel diverter 52, a portion of the fuel is diverted from the fuel passages into the combustion chamber 48, and a portion of the fuel continues to move on through the fuel extension passages 50b to the annular fuel supply chamber 70 behind the nozzle ring 34.

In the meantime, a stream of oxygen is directed through oxygen conduit 31, through the oxygen supply passage 46 of combustor 30, and through combustion chamber 48, on beyond the combustor assembly into the furnace chamber. As the oxygen stream moves from the oxygen conduit 31 into the combustion chamber 48, the fuel being diverted from fuel supply passages 50 by the fuel diverter 52 tends to form a ring of fuel about the stream of oxygen. The cylindrical mixture of fuel and oxygen ignites within the combustion chamber 48, and the flame developed within the combustion chamber is directed at high velocity on beyond the combustor assembly into the furnace. The ring of fuel tends to film cool the surface of the combustion chamber.

The fuel that continues to move on through fuel extension passages 50b eventually moves through the nozzle openings 65 of nozzle ring 34 and forms an annular cloud of fuel about the flame, with the fuel being directed inwardly toward the axis 51 of the combustion chamber, and therefore inwardly toward the stream of oxygen. This tends to enhance the development of the flame as it moves on into the furnace, and tends to maintain the flame in an approximately tubular shape as it surrounds the oxygen in the stream of oxygen.

The oxy-fuel burner 10 can be operated in a stoichiometric mode in which the amount of fuel and the amount of oxygen are matched so that there is complete combustion of both the oxygen and the fuel. This is a typical condition when the oxy-fuel burner is being used to melt scrap and other metals within the furnace.

However, when it is decided to oxygen lance the work product within the furnace, the ratio of oxygen to fuel is increased so that more oxygen is supplied than is required to burn the fuel. Inasmuch as the oxygen is supplied in a high velocity stream through the combustion chamber, the oxygen that is not consumed in the flame is projected toward the work product. As the oxygen moves through the combustion chamber and through the flame within the furnace, the oxygen is preheated so that it is hot when it reaches the work product. The heating of the oxygen causes the oxygen to react readily with the work product, so that a large percentage of the oxygen is involved with the reaction, and the amount of oxygen lost to the atmosphere of the furnace is minimized.

The fuel moving through the fuel supply passages 50 tends to maintain the combustor 30 in a relatively low temperature condition. More particularly, the fuel moving through the fuel extension passages 50b, that surround the combustion chamber 48 cools the flame delivery end of the combustor 30, and the fuel that is diverted by the fuel diverter 52 into the combustion chamber 48 forms a film adjacent the surface of the combustion chamber, and tends to film cool the combustion chamber surface. Moreover, the fuel that is moved on through the fuel extension passages 50b and then through the nozzle ring 34 supplements the flame on beyond the combustor 30 and has a cooling effect at the exposed end of the combustor assembly. This tends to reduce the effect on the exposed portion of the burner of radiation and convection of heat from the flame and from the work product within the furnace.

The amount of fuel that is to be diverted from the fuel supply passages 50 into the combustion chamber 48 can be regulated by projecting the oxygen conduit 31 further toward the combustion chamber 48. This can be accomplished by adjusting the location of the positioning flange 78 of the oxygen conduit 31, and by screwing the oxygen conduit further into or out of the oxygen supply passage 46 of the combustor 30.

At times, the burner will be operated in a pilot mode, whereby a small volume of oxygen and fuel are supplied to the burner so as to generate a very small flame in the combustion chamber. This tends to avoid having the surfaces of the burner become so cool that the spray of slag immediately clings to the burner surfaces; however, this relatively cool mode of operation of the burner permits more slag to accumulate on the surfaces of the burner than would otherwise accumulate during stoichiometric operation or oxygen lancing operation modes. This kind of build-up of slag eventually can clog some of the nozzle openings 65 through the nozzle ring 34, and in some cases can partially block one or more of the fuel supply passages 50, and can accumulate within the combustion chamber 48. When this happens, the combustor begins to become overheated, with the highest temperature usually occuring at the nozzle ring 34, but extending rearwardly into the combustion chamber. After extended operation of the burner with the accumulation of slag, the components of the burner become deteriorated, as by erosion, splitting and chipping.

After the oxy-fuel burner has been utilized for a prolonged period and metallic and non-metallic particles of the environment within the furnace have contacted and accumulated on and about the nozzle ring 34 and combustion chamber 48 and burner opening 20 in the form of slag and it is time for maintenance of the burner, the burner can be dismounted from the water jacket burner mount 14 by the loosening of the mounting bolts 90 and removal of the locking plate 38 from behind the mounting plate 35, whereupon the burner can be axially withdrawn from the tapered burner opening 20. The slag can be chipped and scraped from the surfaces of the burner and from the opening 20. If the exposed end surface 71 of the graphite insulator block 12 has deteriorated to the extent that it needs to be replaced, the nozzle ring 34 can be unscrewed from the combustor 30 and the segment 24 of the graphite insulator block 12 can be slipped off the end of the combustor and a new one substituted therefor. Also, should the nozzle ring 34 need to be replaced, a substitute nozzle ring can be mounted to the combustor. Therefore, these elements of the combustor assembly 11 which are more subject to deterioration than the other elements can be replaced.

However, it is desirable to remove the slag from the surfaces of the burner and from the adjacent surfaces of the furnace opening in which the burner is mounted without dismounting the burner from the furnace. It has been found that the accumulation of slag can be removed by adjusting the supply of fuel and oxygen to the burner. The removal of slag with this procedure makes it possible to remove the burner from the furnace to perform preventive maintenance on a less frequent basis. This can be accomplished by operating the burner with a stoichiometric flame (2 parts oxygen to 1 part natural gas) for a period ranging from 3 to 10 minutes or longer in order to heat the slag. Immediately following the stoichiometric operation, a low velocity oxygen rich flame is produced by reducing the gas input. Combustion ratios for the low velocity oxygen-rich flame will be in the range of 8:1 to 32:1, oxygen to gas, and the time of operation in this mode ranges between 30 seconds to 150 seconds.

The stoichiometric flame elevates the temperature of the slag adhering to the combustion chamber 48, nozzle ring 34 and the surfaces of burner opening 20. When the flame mixture is changed so as to create a low velocity oxygen-rich flame, the unburned oxygen of the flame contacts the slag and oxidizes the slag, causing the slag to melt and be dissipated with the flame. The pieces of molten slag oxidized from the burner surfaces in this manner are expelled out of flame opening at the burner into the furnace.

Theoretically, it is possible that all of the slag build-up on those surfaces that can be contacted by the oxygen-rich flame could be removed with this procedure. The time of operation of the low velocity slag removal oxygen-rich mode is critical to insure that the surfaces of the stainless steel nozzle ring 34, sidewall of the combustion chamber 48 and adjacent surfaces of the burner opening 20 at the flame delivery end of the burner do not begin to oxidize during the time when the slag is being dissipated and after the slag has been blown away.

Typically, the slag cleaning mode will be initiated at the end of the normal stochiometric work product heating mode of the burner cycle in the furnace so as to utilize the heat that was directed into the furnace during the heating mode. For example, during normal work product heating mode of a burner having a combustion chamber as illustrated in the drawings of a diameter of about two (2) inches, the supply of oxygen and natural gas fuel is maintained at about a 2:1 ratio at from 1000 to 50,000 standard cubic feet per hour (SCFH) of oxygen a from 500 to 25,000 SCFH of fuel to generate a high velocity flame that extends from the flame opening of the burner toward the work product a distance of from 2 inches to 10 feet. This mode is used to heat the work product in the furnace. Later, during the oxygen lancing or melting mode the supply of oxygen and fuel is adjusted to about 4:1 ratio at from 2000 to 50,000 SCFH of oxygen and from 500 to 12,500 SCFH of fuel to generate a high velocity stream of preheated oxygen that is directed toward the work product. The high velocity preheated oxygen makes intimate contact with the already hot work product and accelerates the melting of the work product.

The super oxygen-rich slag cleaning mode usually will be initiated between the work product heating mode and the oxygen lancing mode, approximately 120 seconds before the normal end of the heating mode or the normal fire cycle during each charge of the furnace. The super oxygen-rich or slag cleaning mode would be initiated immediately after the heating mode and would extend for from 30 to 50 seconds. After the slag cleaning mode, the operation of the burner can return either to its normal work product heating mode or to its oxygen lancing mode, which functions to cool the burner by the combination of fuel film cooling as previously described and by the recirculating liquid in the internal water circulation chamber 19.

As soon as the slag becomes hot enough (about 2400° F.) during the work product heating mode the slag cleaning mode can be initiated by adjusting the fuel-/oxygen ratio to create an oxygen rich flame. For example, the natural gas input is reduced to between 50 SCFH to 1000 SCFH per hour while the oxygen input remains constant at between 14,000 to 18,000 SCFH. This provides an ultra oxygen-rich low velocity flame. The new firing rate is roughly 0.5 million Btu/hr., but the oxygen:gas ratio is from about 16:1 to 32:1. Preferably at this lower velocity firing rate during the slag cleaning mode, a major portion of the flame envelope will be present within the combusion chamber of the burner so that a major portion of the heat from the flame is transferred to the slag on the surfaces of the combustion chamber of the burner and about the flame opening of the burner, and the excess oxygen makes contact with the slag.

The hot slag particles are attacked by the free, excess hot oxygen in the flame during the slag cleaning mode. The unburned portion of the oxygen that is part of the flame is preheated by the flame and contacts the slag, and the hot oxygen immediately reacts with the slag. The slag is melted by the hot oxygen of the low velocity oxygen-rich flame and this is enough to cause the slag to be ejected out of the front or flame opening of the burner.

EXAMPLE

One example of the modes of operation is: the burner is operated in its normal work product heating mode in which a high velocity flame is generated and directed from the burner inwardly of the furnace toward the solid work product for the purpose of increasing the temperature of the work product. The burner is operated at approximately stochiometric conditions with 8,000 SCFH natural gas and 16,000 SCFH oxygen for approximately 8.5 minutes or longer. This causes the slag accumulated on and about the burner to become hot, about 2400° F. Then the burner is operated in its slag cleaning mode by reducing the supply of natural gas to 500 SCFH and maintaining the supply of oxygen at 16,000 SCFH for approximately thirty (30) seconds. This generates a low velocity, oxygen-rich flame that oxidizes the slab accumulated in and about the burner. Finally, the burner is operated in its oxygen lancing mode by increasing the supply of natural gas to 4000 SCFH and maintaining the supply of oxygen at 16,000 SCFH for about seven (7) minutes. This causes the excess oxygen of the flame to become preheated in the flame and to move at high velocity toward the work product to make intimate contact with the work product.

An optional step can be taken in the process by operating the burner in its work product heating mode for about one minute between the slag cleaning mode and the oxygen lancing mode. This enables the operator to stabilize the operation of the burner and monitor the temperatures and other conditions of the burner and the furnace prior to starting the oxygen lancing mode.

When the burner is operated without adjusting the flame to operate the burner in its slag cleaning mode as described hereinabove, the normal preventive maintenance required to remove the slag from a burner requires about three maintenance hours for each 24 hours of operating the burner in a furnace. Moreover, the normal preventive maintenance procedure requires the burner to be removed from the furnace and a substitute burner inserted in the burner opening of the furnace. By comparison, the preventive maintenance of removing the burner from the furnace can be substantially reduced by frequent operation of the burner in its slag cleaning mode. It has been established that by using the previously described slag cleaning operation a burner can be maintained in operation from 10 to 12 days of 24 hour operation before removal is required for preventive maintenance.

While the operation of the burner in its cleaning mode has been described with specific times and oxygen:fuel ratios, it will be understood by those skilled in the art that the time of operation and the ratio of oxygen to fuel will vary somewhat for burners of different sizes and for different size furnaces. It is recommended that the operation of the burner with its flame in the oxygen-rich slag cleaning mode be carefully monitored, usually being limited to no more than 30 seconds, so as to avoid the hazard of deteriorating the surfaces of the burner. The duration of this mode of operation should be determined from each burner and furnace combination.

While the preceding apparatus and method have been described in connection with natural gas as the fuel that creates the flame in the burner, it will be understood by those skilled in the art that other fuels, such as fluid coal, fuel oil and propane can be used in appropriate proportions with oxygen, included in the self-cleaning mode.

Although the invention has been described in the form of a preferred embodiment, many modifications, additions, and deletions, may be made thereto without departure from the spirit and scope of the invention, as set forth in the following claims.

I claim:

1. A method of removing slag particles from the flame delivery end of the combustion chamber of a high velocity oxygen-fuel burner of an electric arc furnace and the like comprising the steps of supplying oxygen and fuel to the combustion chamber of a burner at a ratio and at volumes to form a high velocity substantially stoichiometric flame directed to a work product in the furnace until slag present at the surface of the burner becomes hot, reducing the amount of fuel supplied to the combustion chamber of the burner to generate an oxygen-rich flame the major portion of which is contained in the combustion chamber to oxidize the previously heated hot slag, and then increasing the volume of fuel which directs a high velocity oxygen-rich flame from the burner in order to have the excess oxygen of the flame make intimate contact with the work product in the furnace.

2. The method of claim 1 and wherein the step of supplying oxygen and fuel to the combustion chamber comprises supplying oxygen in a stream centrally of the combustion chamber and supplying fuel peripherially about the oxygen.

3. The method of claim 1 and wherein the step of reducing the amount of fuel supplied to the combustion chamber of the burner comprises supplying to the combustion chamber fuel and oxygen at a ratio of between 1 to 16 and 1 to 32.

4. The method of claim 1 and wherein the step of reducing the amount of fuel supplied to the combustion chamber comprises supplying enough fuel to the combustion chamber to heat the oxygen as it moves through the combustion chamber.

5. A method of removing slag particles from the flame delivery end of the combustion chamber of a burner of an electric arc furnace or the like, the burner being of the type in which fuel and oxygen are delivered separately to the combustion chamber of the burner and the fuel is delivered about the periphery of a stream of oxygen to generate a high velocity flame that is projected from the combustion chamber of the burner toward a work product in a furnace, said method comprising supplying a mixture of fuel and oxygen to said combustion chamber at a ratio which generates a high velocity flame extending from said combustion chamber toward the work product in the furnace for a period to heat the slag present in the combustion chamber, reducing the amount of fuel supplied to the combustion chamber while substantially maintainng the supply of oxyqen to the combustion chamber to increase the ratio of oxygen to fuel and produce an oxygen-rich flame in the combustion chamber at a volume which forms a flame envelope for a period of up to about thirty seconds, then increasing the fuel-oxygen ratio of the fuel and oxygen supplied to the combustion chamber.

6. The method of claim 5 and wherein the steps of supplying a mixture of fuel and oxygen comprises supplying fuel from a group consisting of natural gas, propane, coal and fuel oil.

7. A method of operating an oxygen-fuel burner of the type utilized with an electric arc furnace to melt metal comprising developing a high velocity approximately stoichiometric flame that is projected from the burner toward a work product in the furnace to heat the work product, after any slag accumulated on or about the burner has been heated by the stoichometric flame, reducing the amount of fuel supplied to the burner to generate a lower velocity oxygen-rich flame which is generated in the combustion chamber of the burner to oxidize the slag present on or about the burner, and after the slag has been oxydized developing a high velocity oxygen-rich flame that is projected from the burner toward the work product in the furnace to oxygen lance and melt the work product.

8. The method of claim 7 and wherein the step of developing a high velocity approximately stoichiometric flame comprises supplying oxygen and natural gas at a ratio of approximately 2:1 to the burner with the fuel generally surrounding stream of oxygen at volumes sufficient to develope a flame a major portion of which is projected from the burner toward the work product, and wherein the step of developing a high velocity oxygen-rich flame comprises supplying oxygen and natural gas at a ratio of approximately 4:1 to the burner with the fuel generally surrounding the stream of oxygen at volumes sufficient to develop a flame a major portion of which is projected from the burner toward the work product.

* * * * *